(12) United States Patent
Shinzawa (10) Patent No.: US 11,117,424 B2
(45) Date of Patent: Sep. 14, 2021

(54) PNEUMATIC TIRE

(71) Applicant: The Yokohama Rubber Co., LTD., Tokyo (JP)

(72) Inventor: Tatsuro Shinzawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 489 days.

(21) Appl. No.: 16/073,697

(22) PCT Filed: Jan. 12, 2017

(86) PCT No.: PCT/JP2017/000873
§ 371 (c)(1),
(2) Date: Jul. 27, 2018

(87) PCT Pub. No.: WO2017/135004
PCT Pub. Date: Aug. 10, 2017

(65) Prior Publication Data
US 2019/0030963 A1    Jan. 31, 2019

(30) Foreign Application Priority Data

Feb. 5, 2016   (JP) .............................. JP2016-021166

(51) Int. Cl.
*B60C 9/00*       (2006.01)
*B60C 19/00*      (2006.01)
(Continued)

(52) U.S. Cl.
CPC .............. *B60C 19/002* (2013.01); *B60C 3/06* (2013.01); *B60C 5/00* (2013.01); *B60C 9/00* (2013.01);
(Continued)

(58) Field of Classification Search
CPC ........................... B60C 19/002; B60C 19/001
See application file for complete search history.

(56) References Cited

U.S. PATENT DOCUMENTS 7,874,329 B2 *   1/2011   Tanno ................... B60C 19/002
                                                          152/155
2007/0017619 A1   1/2007   Yukawa
(Continued)

FOREIGN PATENT DOCUMENTS

CN          102001263        4/2011
DE    10 2012 214 866        2/2013
(Continued)

OTHER PUBLICATIONS

Hideki CN 102001263 English translation (Year: 2011).*
(Continued)

*Primary Examiner* — Jacob T Minskey
*Assistant Examiner* — Adrien J Bernard
(74) *Attorney, Agent, or Firm* — Thorpe North & Western (57) ABSTRACT

A pneumatic tire includes a band-shaped sound absorbing member bonded along a tire circumferential direction to the tire inner surface in a tread portion; at least one full cover layer covering the entire width of belt layers on the outer circumferential side of the belt layers; and a center cover layer disposed on the outer circumferential side of the full cover layer, the center cover layer locally covering the tire lateral direction center region of the belt layers; a width SW of the band-shaped sound absorbing member and a width BW of the belt layers satisfying a relationship SW/BW=0.3 to 0.8, and a width CW of the center cover layer and the width SW of the band-shaped sound absorbing member satisfying the relationship CW/SW=0.05 to 0.35.

8 Claims, 4 Drawing Sheets

(51) Int. Cl.
  *B60C 9/22* (2006.01)
  *B60C 5/00* (2006.01)
  *B60C 9/20* (2006.01)
  *B60C 9/28* (2006.01)
  *B60C 3/06* (2006.01)

(52) U.S. Cl.
  CPC .......... *B60C 9/0042* (2013.01); *B60C 9/2009* (2013.01); *B60C 9/22* (2013.01); *B60C 9/28* (2013.01); *B60C 19/001* (2013.01); *B60C 2009/2223* (2013.01); *B60C 2009/2238* (2013.01)

(56) References Cited

U.S. PATENT DOCUMENTS

| | | | |
|---|---|---|---|
| 2009/0277549 A1 | 11/2009 | Tanno | |
| 2010/0294406 A1* | 11/2010 | Tanno | B60C 19/002 152/157 |
| 2011/0048607 A1 | 3/2011 | Seto et al. | |
| 2013/0048185 A1 | 2/2013 | Harikae et al. | |
| 2013/0160914 A1 | 6/2013 | Oba | |
| 2016/0297260 A1 | 10/2016 | Tanno | |
| 2017/0008353 A1 | 1/2017 | Kishizoe et al. | |
| 2017/0008354 A1 | 1/2017 | Sakamoto et al. | |

FOREIGN PATENT DOCUMENTS

| | | |
|---|---|---|
| DE | 11 2014 006 241 | 10/2016 |
| JP | 2007-022445 | 2/2007 |
| JP | 2011-255684 | 12/2011 |
| JP | 2012-086600 | 5/2012 |
| JP | 5267288 | 8/2013 |
| WO | WO 2012/050000 | 4/2012 |
| WO | WO 2015/076383 | 5/2015 |
| WO | WO 2015/111314 | 7/2015 |
| WO | WO 2015/111315 | 7/2015 |

OTHER PUBLICATIONS

Hata JP2011255684 English Translation (Year: 2011).*
International Search Report for International Application No. PCT/JP2017/000873 dated Feb. 21, 2017, 4 pages, Japan.

* cited by examiner

PNEUMATIC TIRE

TECHNICAL FIELD

The present technology relates to a pneumatic tire equipped with a tire noise reduction device, and more particularly refers to a pneumatic tire that can achieve sufficient quietness via a band-shaped sound absorbing member attached to a tire inner surface and prevent a reduction in high-speed durability caused by the accumulation of heat in the band-shaped sound absorbing member at high speeds.

BACKGROUND ART

One cause of tire noise is cavernous resonance caused by vibration of the air in the cavity portion (tire cavity) formed within the tire when mounted on a rim. When a vehicle is run, uneven road surfaces cause a tread portion to vibrate on contact with the road surface, causing the air inside the tire cavity portion to vibrate which causes cavernous resonance to be generated. A specific frequency band of the cavernous resonance is perceived to be noise, so reducing the sound pressure level (noise level) of this frequency band is important for reducing the tire noise.

Introducing a sound absorbing member made from a porous material such as sponge or the like into the tire cavity has been proposed as a method of reducing this noise. For example, in the pneumatic tire described in Japanese Patent No. 5267288, providing a band-shaped sound absorbing member bonded with adhesive to an inner circumferential surface of the tread portion has been proposed. However, with this structure, the sound absorbing member is directly applied to the tire inner surface, so that high speeds, heat can easily build up in the tread portion. This accumulated heat can cause degradation of high-speed durability.

SUMMARY

The present technology provides a pneumatic tire including a tire noise reduction device, the pneumatic tire being able to achieve sufficient quietness via a band-shaped sound absorbing member attached to the tire inner surface and prevent any reduction in high-speed durability caused by the accumulation of heat in the band-shaped sound absorbing member at high speeds.

A pneumatic tire according to an embodiment of the present technology includes:

an annular-shaped tread portion extending in a tire circumferential direction;

a pair of sidewall portions disposed on either side of the tread portion;

a pair of bead portions disposed inward of the sidewall portions in a tire radial direction;

a carcass portion mounted between the pair of bead portions;

a plurality of belt layers disposed on an outer circumferential side of the carcass layer in the tread portion;

a band-shaped sound absorbing member bonded to a tire inner surface in the tread portion along the tire circumferential direction;

at least one full cover layer disposed on an outer circumferential side of the plurality of belt layers and covering a full width of the plurality of belt layers; and a center cover layer disposed on an outer circumferential side of the full cover layer and locally covering a center region of the plurality of belt layers in a tire lateral direction.

A width SW of the band-shaped sound absorbing member and a width BW of the plurality of belt layers satisfy a relationship SW/BW=0.3 to 0.8, and a width CW of the center cover layer and the width SW of the band-shaped sound absorbing member satisfy a relationship CW/SW=0.05 to 0.35.

The present technology includes the center cover layer having the width CW corresponding to the width BW of the belt layers and the width SW of the sound absorbing member. Thus, rising of the belt layers at high speed can be effectively reduced, and even in the state in which heat build-up can easily occur when the sound absorbing member is directly applied, reduction of high-speed durability due to this heat build-up can be prevented. In particular, the width SW of the sound absorbing member is set to an appropriate range with respect to the width BW of the belt layers, so the sound absorbing effect can be effectively exhibited while maintaining sufficient durability of the sound absorbing member itself. Also, the width CW of the center cover layer is set within an appropriate small range with respect to the width SW of the sound absorbing member, so the increase in stiffness resulting from the addition of the center cover layer is reduced, and ride comfort and quietness can be suitably maintained. As a result, degradation of the high-speed durability can be effectively prevented while maintaining excellent quietness.

In an embodiment of the present technology, preferably, a mounting direction with respect to a vehicle is designated; and when the pneumatic tire is mounted on a vehicle, an outer side of a tire equator with respect to the vehicle is a vehicle outer side, and when the pneumatic tire is mounted on a vehicle, an inner side of the tire equator with respect to the vehicle is a vehicle inner side. Preferably a width $SW_{OUT}$ of a portion of the band-shaped sound absorbing member on the vehicle outer side, a width $SW_{IN}$ of a portion of the band-shaped sound absorbing member on the vehicle inner side, and a width CW of the center cover layer satisfy the relationships $SW_{IN}/CW<5$, $SW_{OUT}/CW<8$, and $SW_{IN}/SW_{OUT}<0.9$. In this way, on vehicles in which the tires are mounted with negative camber for intentional high-speed travel, the heat build-up on the vehicle inner side where the build-up occurs relatively easily is effectively reduced, and, the effect of improvement in high-speed durability by the center cover layer can be effectively exhibited.

In an embodiment of the present technology, a mounting direction with respect to a vehicle is designated; and when the pneumatic tire is mounted on the vehicle, an outer side of a tire equator with respect to the vehicle is a vehicle outer side, and when the pneumatic tire is mounted on the vehicle, an inner side of the tire equator with respect to the vehicle is a vehicle inner side. Preferably, a cross-sectional area $SA_{OUT}$ of a portion of the band-shaped sound absorbing member on the vehicle inner side, and a cross-sectional area $SA_{IN}$ of a portion of the band-shaped sound absorbing member on the vehicle inner side, and a cross-sectional area T of a tire cavity satisfy the relationships $0 \leq SA_{IN}/t \leq 0.2$ and $0.1 \leq SA_{OUT}/t \leq 0.4$ (t=T/2). In this way, on vehicles in which the tires are mounted with negative camber for intentional high-speed travel, the heat build-up on the vehicle inner side where the build-up occurs relatively easily is effectively reduced, and, the effect of improvement in high-speed durability by the center cover layer can be effectively exhibited.

In an embodiment of the present technology, preferably the center cover layer is made from organic fiber cords in which nylon fiber and aramid fiber are intertwined. In this way the durability can be effectively improved based on the characteristics of composite fiber cord made from nylon fiber and aramid fiber.

In an embodiment of the present technology, preferably the band-shaped sound absorbing member includes a missing portion at at least one section in the tire circumferential direction. This makes the band-shaped sound absorbing member able to withstand for a long period the deformation of the tire (expansion of the tire) when inflated and the shear strain of the adhering surface due to rolling on the ground.

In the present technology, each dimension and cross-sectional area of the tire is measured with the tire mounted on a regular rim and inflated to the regular internal pressure. In particular, in each case the width of each member is the length in the width direction between the two ends of the member in this state. Note that the "width BW of the belt layers" is the width of the belt layer disposed on the outermost circumferential side, among the plurality of belt layers. Also, the "cross-sectional area of the tire cavity" is the cross-sectional area in a meridian cross section of the cavity portion formed between the tire and the rim, in this state. "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). "Regular internal pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire. "Regular load" is a load defined by a standard for each tire according to a system of standards that includes standards on which tires are based, and refers to a "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO.

DETAILED DESCRIPTION

The configuration of the present technology is described in detail below with reference to the accompanying drawings.

Figure 1:
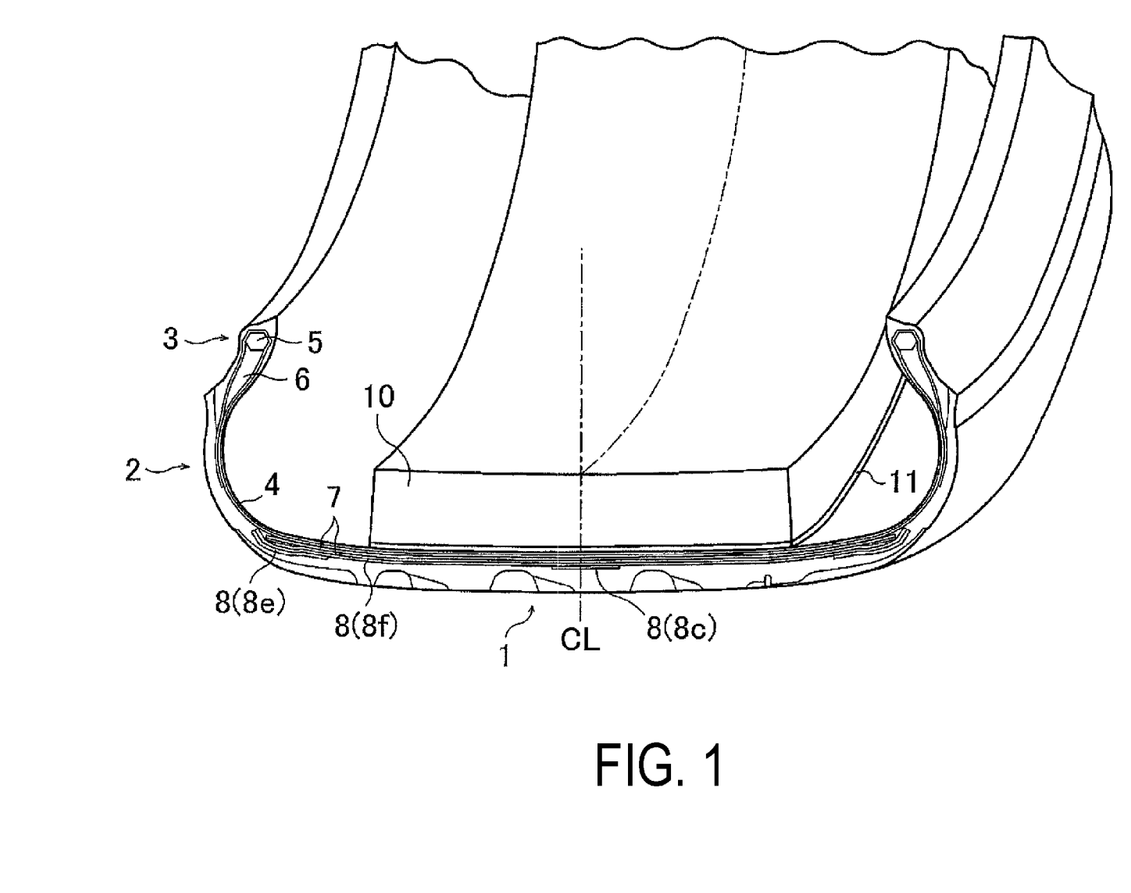
FIG. 1 is a perspective cross-sectional view of a pneumatic tire according to an embodiment of the present technology.

Reference sign CL in FIG. 1 denotes a tire equator. The pneumatic tire according to an embodiment of the present technology includes an annular-shaped tread portion 1 extending in a tire circumferential direction, a pair of sidewall portions 2 disposed on both sides of the tread portion 1, and a pair of bead portions 3 disposed inward of the sidewall portions 2 in a tire radial direction.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. In the tread portion 1, a plurality of belt layers 7 (two layers in the illustrated example) is embedded on an outer circumferential side of the carcass layer 4. These belt layers 7 each include a plurality of reinforcing cords that are inclined with respect to the tire circumferential direction, and the direction of the reinforcing cords of the different layers intersect each other. In the belt layers 7, the inclination angle of the reinforcing cords with respect to the tire circumferential direction is set in the range, for example, from 10° to 40°.

In an embodiment of the present technology, this typical pneumatic tire is provided with a belt cover layer 8 on the outer circumferential side of the belt layers 7 as described later, and, a band-shaped sound absorbing member 10 is mounted on a tire inner surface as described later. The basic structure of the pneumatic tire excluding the belt cover layer 8 and the band-shaped sound absorbing member 10 is not limited to the structure as described above.

In the present technology, a plurality of the belt cover layers 8 are provided on the outer circumferential side of the belt layers 7 as described above. However, this plurality of belt cover layers 8 need to include at least one (there is one layer in the illustrated example) full cover layer 8*f* disposed on the belt layers 7 side so as to cover the whole width of the belt cover layers 7, and a center cover layer 8*c* disposed on the outer circumferential side of the full cover layer 8*f* locally covering a center region in the tire lateral direction of the belt layers 7. Note that in the example illustrated, edge cover layers 8*e* are also provided disposed on the outer circumferential side of the full cover layer 8*f* and locally covering the two end portions in the tire lateral direction of the belt layers 7. The belt cover layers 8 each include organic fiber cords oriented in the tire circumferential direction, and the fiber organic cords are set with an angle with respect to the tire circumferential direction of, for example, from 0° to 5°. Note that there is no particular limitation on the type of organic fiber cord, but at least for the center cover layer 8*c*, organic fiber cord obtained by intertwining nylon fiber and aramid fiber is preferably used, in order to reduce rising of the belt layers 7 at high speeds at locations greatly affected by the build up of heat as described later, and to effectively realize this effect.

In an embodiment of the present technology the band-shaped sound absorbing member 10 is provided on the tire inner surface as described above. The band-shaped sound absorbing member 10 is made of a porous material with open cells, and has predetermined noise absorbing properties based on the porous structure. For example, polyurethane foam can be used as the porous material of the band-shaped sound absorbing member 10. The band-shaped sound absorbing member 10 is bonded to a region of the tire inner surface corresponding to the tread portion 1, for example via an adhesive layer 11. For example, double-sided tape is preferably used as the adhesive layer 11.

Figure 2:
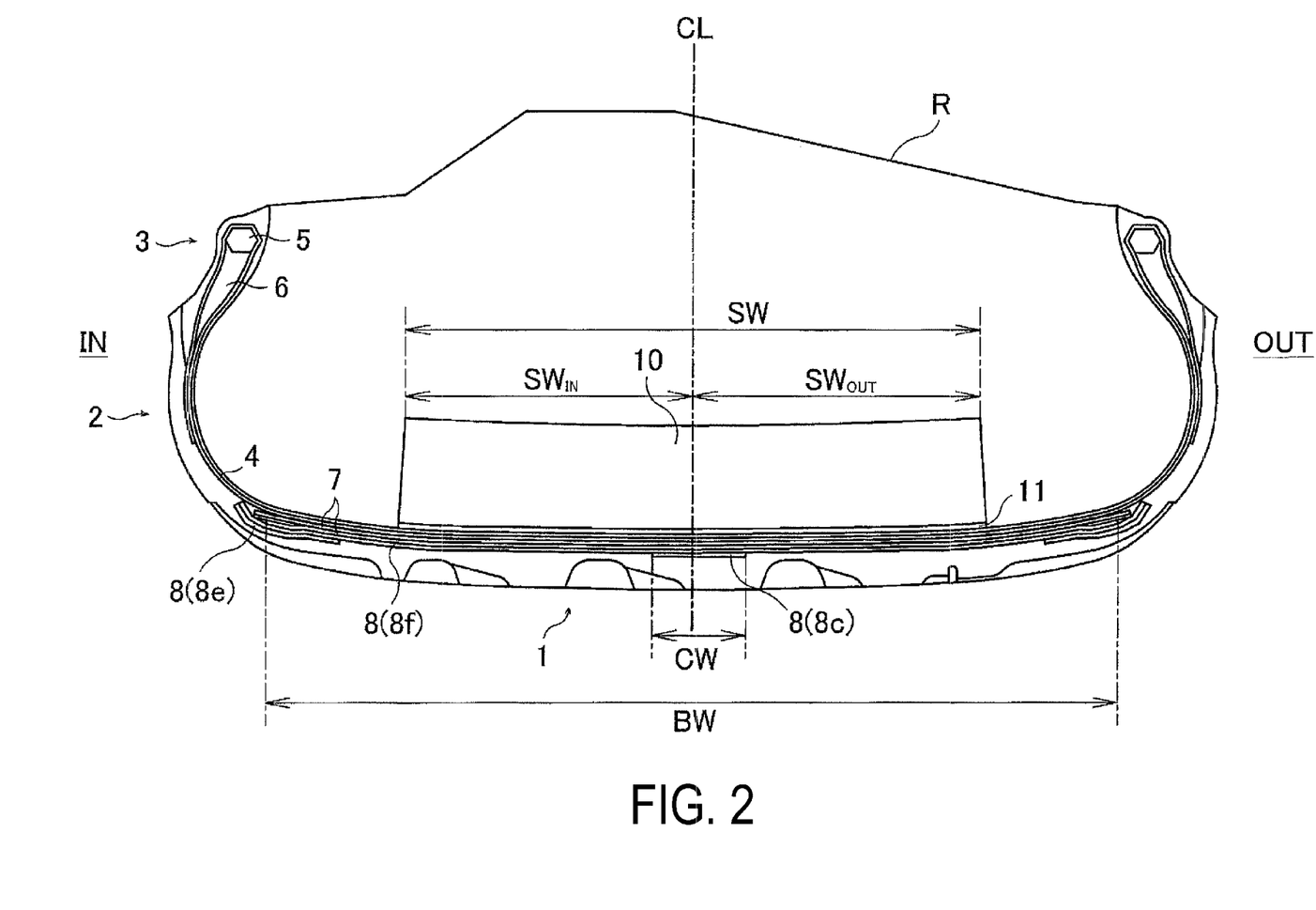
FIG. 2 is a meridian cross-sectional view illustrating the pneumatic tire of FIG. 1.

In providing the belt cover layer 8 and the band-shaped sound absorbing member 10 in this way, as illustrated in FIG. 2, a width of the belt layers 7 is BW, a width of the center cover layer 8c from among the cover layers 8 is CW, and a width of the band-shaped sound absorbing member 10 is SW, and the ratio SW/BW of the width SW of the band-shaped sound absorbing member 10 and the width BW of the belt layers 7 is set to from 0.3 to 0.8, and the ratio CW/SW of the width CW of the center cover layer 8c and the width SW of the band-shaped sound absorbing member 10 is set to from 0.05 to 0.35.

In this way, on a tire in which the band-shaped sound absorbing member 10 is directly applied to the tire inner surface so heat build up can easily occur, the center cover layer 8c is provided, so rising of the belt layers 7 at high speed can be reduced, and the reduction in high-speed durability due to heat build up can be prevented. In this case, the width SW of the band-shaped sound absorbing member 10 is set corresponding to the width BW of the belt layers 7, and in addition the width CW of the center cover layer 8c is set corresponding to the width SW of the band-shaped sound absorbing member 10. Therefore, rising of the belt layers at high speed is effectively reduced by the center cover layer 8c while exhibiting a good quietness effect due to the band-shaped sound absorbing member 10, so a reduction in high-speed durability caused by heat build up can be prevented. In particular, the width SW of the band-shaped sound absorbing member 10 is set to an appropriate range with respect to the width BW of the belt layers 7, so the sound absorbing effect of the band-shaped sound absorbing member 10 can be effectively exhibited while maintaining sufficient durability of the band-shaped sound absorbing member 10 itself. Also, the width CW of the center cover layer 8c is set within an appropriate small range with respect to the width SW of the band-shaped sound absorbing member 10, so an increase in rigidity resulting from the addition of the center cover layer 8c is reduced, and ride comfort and quietness can be suitably maintained. As a result, degradation of the high-speed durability can be effectively prevented while maintaining excellent quietness.

When the ratio SW/BW is less than 0.3, sufficient mass of the band-shaped sound absorbing member 10 cannot be provided, so sound absorbing performance is reduced, and it is difficult to ensure sufficient quietness. Note that in connection with these relationships regarding the widths, in a case where the thickness of the band-shaped sound absorbing member 10 is increased, sufficient mass of the band-shaped sound absorbing member 10 can be provided, but the band-shaped sound absorbing member 10 is made larger (more bulky) with respect to the adhering surface, so durability is reduced. When the ratio SW/BW is greater than 0.8, delamination can easily occur from the two ends in the width direction of the band-shaped sound absorbing member 10, so the durability is reduced. In order to provide better quietness while maintaining sufficient durability of the band-shaped sound absorbing member 10 itself, the ratio SW/BW may be set within the range, for example, from 0.5 to 0.7. When the ratio CW/SW is less than 0.05, the center cover layer 8c is too small, so a sufficient strengthening effect cannot be obtained from the center cover layer 8c, and the effect of reducing rising of the belt layer 7 at high speeds is limited. In other words, degradation of high-speed durability cannot be sufficiently prevented. When the ratio CW/SW is larger than 0.35, the rigidity of the tread portion 1 is excessive, and conversely the ride comfort and quietness is adversely affected. In order to more effectively prevent rising of the belt layer 7 at high speeds without excessively increasing the rigidity of the tread portion 1, the ratio CW/SW may be set, for example, within the range from 0.1 to 0.25.

For vehicles intended for travel at high speeds, normally the pneumatic tires are mounted having negative camber. When the mounting direction on the vehicle is designated for this purpose, the heat build-up of the tread portion at high speeds tends to differ between the side on the outer side of the tire equator when mounted on the vehicle (vehicle outer side) and the side on the inner side of the tire equator when mounted on the vehicle (vehicle inner side). Specifically, heat build-up occurs more easily on the vehicle inner side than on the vehicle outer side. Therefore, the band-shaped sound absorbing member 10 which can easily cause heat build-up is preferably shifted to the vehicle outer side, so that the heat build-up element (band-shaped sound absorbing member 10) is reduced on the side where heat build-up more easily occurs.

Specifically, as illustrated in FIG. 2, the width of the portion of the band-shaped sound absorbing member 10 on the vehicle inner side is $SW_{OUT}$, and the width of the portion of the band-shaped sound absorbing member 10 on the vehicle inner side is $SW_{IN}$; and the ratio $SW_{IN}/CW$ of the width $SW_{IN}$ and the width CW of the center cover layer 8c is preferably less than 5 ($SW_{IN}/CW<5$), the ratio $SW_{OUT}/CW$ of the width $SW_{OUT}$ and the width CW of the center cover layer 8c is preferably less than 8 ($SW_{OUT}/CW<8$), and the ratio $SW_{IN}/SW_{OUT}$ of the width $SW_{IN}$ and the width $SW_{OUT}$ is preferably less than 0.9 ($SW_{IN}/SW_{OUT}\leq0.9$). By setting the width of each portion of each member in the appropriate range in this way, on vehicles on which the tires are mounted with negative camber intended for high-speed travel, the heat build-up on the vehicle inner side where the build-up occurs relatively easily is effectively reduced, and, the effect of improvement in high-speed durability by the center cover layer 8c can be effectively exhibited. When the ratio SWIM/CW is greater than 5, the width of the portion of the band-shaped sound absorbing member 10 on the vehicle inner side is too large relative to the center cover layer 8c, and the band-shaped sound absorbing member 10 located on the vehicle inner side where heat build-up can easily occur with negative camber cannot be reduced sufficiently, so a sufficient effect of reducing heat build-up cannot be obtained. When the ratio $SW_{OUT}/CW$ is greater than 8, the width of the portion of the band-shaped sound absorbing member 10 on the vehicle outer side is too large relative to the center cover layer 8c, so delamination can easily occur from the end portion on the vehicle outer side of the band-shaped sound absorbing member 10 and it is difficult to achieve sufficient durability. When the ratio $SW_{IN}/SW_{OUT}$ is greater than 0.9, the width of the portion of the band-shaped sound absorbing member 10 on the vehicle inner side and the width of the portion on the vehicle outer side are substantially the same, and a sufficient effect of shifting the band-shaped sound absorbing member 10 to the vehicle outer side cannot be obtained. The ratios of each portion are preferably $0<SW_{IN}/CW<2.2$, $3<SW_{OUT}/CW<7$, and $0<SW_{IN}/SW_{OUT}<0.5$.

Figure 3:
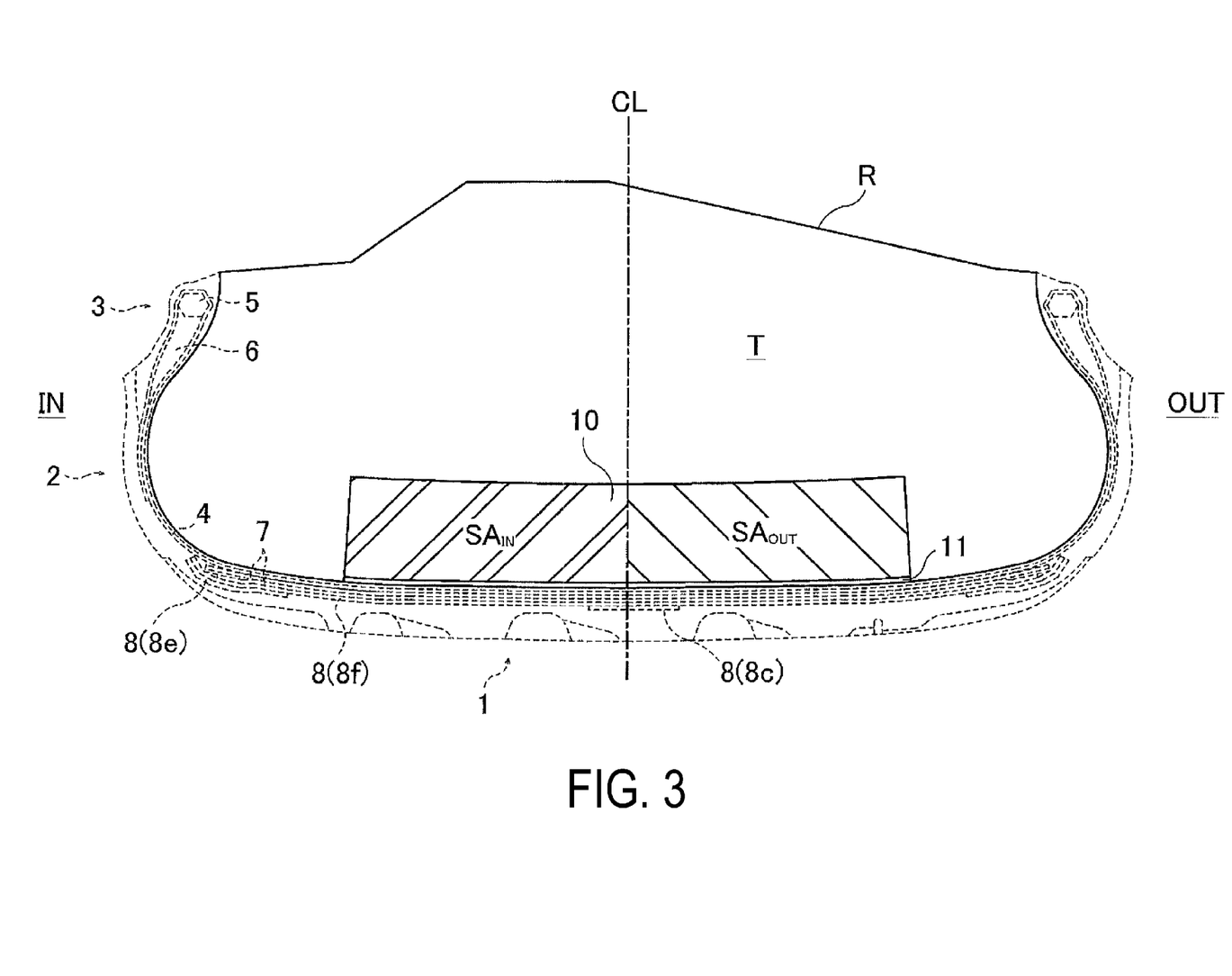
FIG. 3 is a meridian cross-sectional view corresponding to FIG. 2 for describing the cross-sectional area of each part.

Also, as illustrated in FIG. 3, the cross-sectional area of the portion of the band-shaped sound absorbing member 10 on the vehicle outer side is $SA_{OUT}$ (the single-line hatched portion in FIG. 3), the cross-sectional area of the portion on the vehicle inner side of the band-shaped sound absorbing member 10 is $SA_{IN}$ (the double line hatched portion in FIG. 3), the cross-sectional area of the tire cavity formed between the tire and a rim R is T (all the portion drawn with a solid line in FIG. 3), and ½ times the cross-sectional area T is t (t=T/2), and preferably the ratio $SA_{IN}/t$ of the cross-sectional area $SA_{IN}$ and t is from 0 to 0.2 ($0 \le SA_{IN}/t \le 0.2$), and the ratio $SA_{OUT}/t$ of $SA_{OUT}$ and t is from 0.1 to 0.4 ($0.1 \le SA_{OUT}/t \le 0.4$). By setting the cross-sectional area of each portion of each member in the appropriate range in this way, on vehicles on which the tires are mounted with negative camber intended for high-speed travel, the heat build-up on the vehicle inner side where the build-up occurs relatively easily is effectively reduced, and, an effect of enhancing high-speed durability by the center cover layer 8c can be effectively exhibited. When the ratio $SA_{IN}/t$ is greater than 0.2, the portion of the band-shaped sound absorbing member 10 on the vehicle inner side cannot be reduced sufficiently, and the band-shaped sound absorbing member 10 located on the vehicle inner side where heat build-up can easily occur with negative camber cannot be reduced sufficiently, so a sufficient effect of reducing heat build-up cannot be obtained. When the ratio $SA_{OUT}/t$ is less than 0.1, the portion of the band-shaped sound absorbing member 10 on the vehicle outer side cannot be sufficiently increased, so the portion of the band-shaped sound absorbing member 10 on the vehicle outer side relative to the portion on the vehicle inner side cannot be sufficiently provided, and a sufficient effect of shifting the band-shaped sound absorbing member 10 to the vehicle outer side cannot be obtained. When the ratio $SA_{OUT}/t$ is greater than 0.4, the portion of the band-shaped sound absorbing member 10 on the vehicle outer side is too large, so delamination can easily occur from the end portion on the vehicle outer side of the band-shaped sound absorbing member 10 and it is difficult to achieve sufficient durability.

In addition, preferably the ratio $SA_{IN}/SA_{OUT}$ of the cross-sectional area $SA_{IN}$ of the portion of the band-shaped sound absorbing member 10 on the vehicle inner side and the cross-sectional area $SA_{OUT}$ of the portion of the band-shaped sound absorbing member 10 on the vehicle outer side is less than 0.9 ($SA_{IN}/SA_{OUT}<0.9$), and more preferably is in the range from 0 to 0.7 ($0<SA_{IN}/SA_{OUT}<0.7$). Also, preferably the ratio $SA/T$ of the total cross-sectional area of the band-shaped sound absorbing member 10 SA ($=SA_{IN}+SA_{OUT}$) and the cross-sectional area T of the tire cavity is in the range from 0.05 to 0.4 ($0.05<SA/T<0.4$), and more preferably is in the range from 0.1 to 0.3 ($0.1<SA/T<0.3$). By setting the cross-sectional area of each portion in this way, there can be a good balance between the portion of the band-shaped sound absorbing member 10 on the vehicle inner side and the portion on the vehicle outer side, which has the advantage of providing good quietness and high-speed durability in a compatible manner to a high degree. When the ratio $SA_{IN}/SA_{OUT}$ is equal to or greater than 0.9, the cross-sectional area of the portion of the band-shaped sound absorbing member 10 on the vehicle inner side and the cross-sectional area of the portion on the vehicle outer side are substantially the same, and a sufficient effect of shifting the band-shaped sound absorbing member 10 towards the vehicle outer side cannot be obtained. When the ratio $SA/T$ is less than 0.05, the band-shaped sound absorbing member is too small so it is difficult to obtain a sufficient sound absorbing effect. When the ratio $SA/T$ is greater than 0.4, the effect of reducing cavernous resonance becomes constant, so there is no likelihood of further sound reduction effect, but conversely there is concern of an increase in the tire weight due to the increase in the band-shaped sound absorbing member 10.

Figure 4:
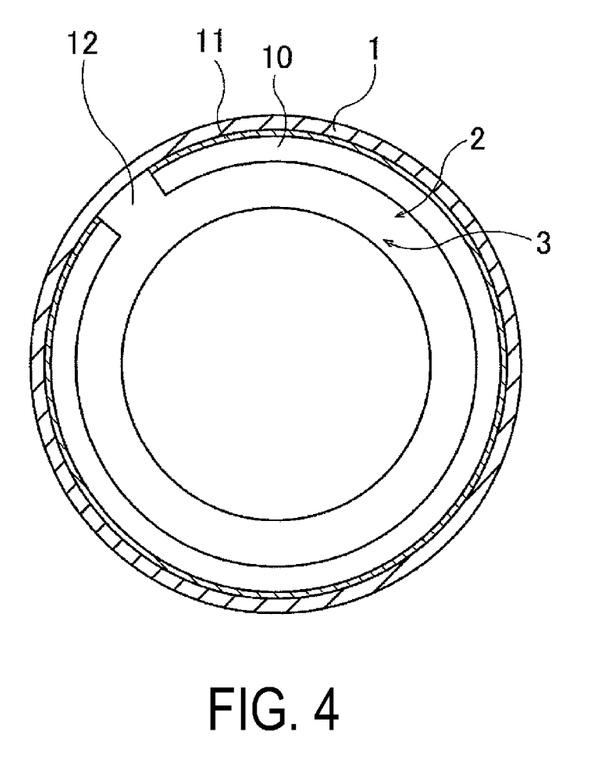
FIG. 4 is a cross-sectional view taken along an equator line of a pneumatic tire according to an embodiment of the present technology.

The width and the cross-sectional area of the band-shaped sound absorbing member 10 are set as described above, but as illustrated in FIG. 4, preferably the shape is such that there is a missing portion 12 where there is no band-shaped sound absorbing member 10 at at least one location in the circumferential direction. By providing the missing portion 12 in this way, the expansion due to inflation of the tire and the shear strain due to rolling on the ground can be withstood for a long period of time. The missing portion 12 is preferably provided at one location or 3 to 5 locations on the tire circumference. In other words, if the missing portion 12 is provided at two locations on the tire circumference, the tire uniformity is significantly degraded due to mass unbalance, and in a case where it is provided at six or more locations on the circumference the manufacturing cost is significantly increased.

EXAMPLES

Sixteen different pneumatic tires with a tire size of 275/35ZR20 were manufactured having the basic structure illustrated in FIG. 1, to produce Conventional Example 1, Comparative Examples 1 to 4, and Examples 1 to 11. The following ratios of the widths and cross-sectional areas of each member (belt layer, center cover layer, and band-shaped sound absorbing member) were set as shown in Table 1: ratio SW/BW of the width SW of the band-shaped absorbing member and the width BW of the belt layer; ratio CW/SW of the width CW of the center cover layer and the width SW of the band-shaped sound absorbing member; ratio $SW_{IN}/CW$ of the width $SW_{IN}$ of the portion of the band-shaped sound absorbing member on the vehicle inner side and the width CW of the center cover layer 8c; ratio $SW_{OUT}/CW$ of the width $SW_{OUT}$ of the portion of the band-shaped sound absorbing member on the vehicle inner side and the width CW of the center cover layer 8c; ratio $SW_{IN}/SW_{OUT}$ of the width $SW_{OUT}$ of the portion of the band-shaped sound absorbing member on the vehicle outer side and the width $SW_{IN}$ of the portion of the band-shaped sound absorbing member on the vehicle inner side; ratio $SA_{IN}/t$ of the cross-sectional area $SA_{IN}$ of the portion of the band-shaped sound absorbing member on the vehicle inner side and ½ times the cross-sectional area T of the tire cavity (t); ratio $SA_{OUT}/t$ of the cross-sectional area $SA_{OUT}$ of the portion of the band-shaped sound absorbing member on the vehicle outer side and ½ times the cross-sectional area T of the tire cavity (t); ratio $SA_{IN}/SA_{OUT}$ of the cross-sectional area $SA_{IN}$ of the portion of the band-shaped sound absorbing member on the vehicle inner side and the cross-sectional area $SA_{OUT}$ of the portion of the band-shaped sound absorbing member on the vehicle outer side; and the ratio SA/T of the total cross-sectional area SA ($=SA_{IN}+SA_{OUT}$) of the band-shaped sound absorbing member and the cross-sectional area T of the tire cavity.

Note that in all the examples, the width of the belt layer on the outermost side was 230 mm, and the thickness of the band-shaped sound absorbing member was 25 mm. Also, in all the examples having the center cover layer, the center cover layer was made from organic fiber cords with nylon fiber and aramid fiber intertwined. Conventional Example 1 was an example not having the center cover layer. Thus, the value in the column CW/SW is 0, and the column for the center cover layer (width) is blank.

High-speed durability, ride comfort, and quietness were evaluated for these 16 pneumatic tires according to the following evaluation methods, and the results thereof are shown in Table 1.

High-Speed Durability

Each test tire was assembled on a wheel having a rim size of 20×9.5 J, and traveling tests were carried out using a drum testing machine under the conditions of air pressure 270 kPa, load 7.5 kN, and camber angle −2°. Specifically, the initial speed was 250 km/h, and the speed was increased by 10 km/h every 20 minutes, and the test continued until tire failure occurred, and the speed at which tire failure occurred was measured. The evaluation results indicate the measured value (speed) of each test tire. Larger index values indicate superior high-speed durability.

Ride Comfort

Each test tire was assembled on a wheel having a rim size of 20×9.5 J, inflated to an air pressure of 230 kPa, mounted on a test vehicle with engine displacement 3000 cc, and a traveling test was carried out by a test driver by driving 5 laps of a 5 km test circuit, and the ride comfort was evaluated by sensory evaluation. The evaluation results were evaluated in 5 stages with Conventional Example 1 set as "3". Higher numbers indicate superior ride comfort.

Quietness

Each test tire was assembled on a wheel having a rim size of 20×9.5 J, inflated to an air pressure of 230 kPa and mounted on a test vehicle with engine displacement 3000 cc. The test vehicle was driven at an average speed of 50 km/h on a test course with an asphalt road surface. The sound pressure level of the noise was measured from a microphone installed at the position of the driver's side window, and the inverse of the measurement values were allocated to 5 levels with Conventional Example 1 set as "3". Larger index values indicate superior quietness.

the sound absorbing member was significantly increased, and the center cover layer was unable to sufficiently compensate for the high-speed durability, so the high-speed durability was degraded. In Comparative Example 3, the center cover layer was too small, so an effect of enhancing high-speed durability was not obtained. In Comparative Example 4, the center cover layer was too large so conversely an adverse effect on the ride comfort and quietness was seen.

The invention claimed is:

1. A pneumatic tire, comprising:
   an annular-shaped tread portion extending in a tire circumferential direction;
   a pair of sidewall portions disposed on either side of the tread portion;
   a pair of bead portions disposed inward of the sidewall portions in a tire radial direction;
   a carcass layer mounted between the pair of bead portions;
   a plurality of belt layers disposed on an outer circumferential side of the carcass layer in the tread portion;
   a band-shaped sound absorbing member bonded to a tire inner surface in the tread portion along the tire circumferential direction;
   at least one full cover layer disposed on an outer circumferential side of the plurality of belt layers and covering a full width of the plurality of belt layers; and

TABLE 1

|  | Conventional Example 1 | Example 1 | Comparative Example 1 | Example 2 | Example 3 | Example 4 | Comparative Example 2 | Comparative Example 3 |
|---|---|---|---|---|---|---|---|---|
| SW/BW | 0.7 | 0.7 | 0.2 | 0.3 | 0.5 | 0.8 | 0.9 | 0.7 |
| CW/SW | 0 | 0.2 | 0.2 | 0.2 | 0.2 | 0.2 | 0.2 | 0.01 |
| $SW_{IN}$/CW | — | 2.5 | 2.5 | 2.5 | 2.5 | 2.5 | 2.5 | 50 |
| $SW_{OUT}$/CW | — | 2.5 | 2.5 | 2.5 | 2.5 | 2.5 | 2.5 | 50 |
| $SW_{IN}$/$SW_{OUT}$ | 1 | 1 | 1 | 1 | 1 | 1 | 1 | 1 |
| $SA_{IN}$/t | 0.2 | 0.2 | 0.2 | 0.2 | 0.2 | 0.2 | 0.2 | 0.2 |
| $SA_{OUT}$/t | 0.2 | 0.2 | 0.2 | 0.2 | 0.2 | 0.2 | 0.2 | 0.2 |
| $SA_{IN}$/$SA_{OUT}$ | 1 | 1 | 1 | 1 | 1 | 1 | 1 | 1 |
| SA/T | 0.25 | 0.25 | 0.07 | 0.11 | 0.18 | 0.29 | 0.32 | 0.25 |
| High-speed durability km/h | 310 | 330 | 340 | 330 | 330 | 320 | 300 | 310 |
| Ride comfort | 3 | 3 | 3 | 3 | 3 | 3 | 3 | 3 |
| Quietness | 3 | 3 | 2 | 3 | 3 | 4 | 4 | 3 |

|  | Example 5 | Example 6 | Example 7 | Example 8 | Comparative Example 4 | Example 9 | Example 10 | Example 11 |
|---|---|---|---|---|---|---|---|---|
| SW/BW | 0.7 | 0.7 | 0.7 | 0.7 | 0.7 | 0.7 | 0.7 | 0.7 |
| CW/SW | 0.05 | 0.1 | 0.25 | 0.35 | 0.8 | 0.2 | 0.2 | 0.2 |
| $SW_{IN}$/CW | 10 | 5 | 2 | 1.429 | 0.625 | 2.4 | 1.9 | 0 |
| $SW_{OUT}$/CW | 10 | 5 | 2 | 1.429 | 0.625 | 2.6 | 3.1 | 5 |
| $SW_{IN}$/$SW_{OUT}$ | 1 | 1 | 1 | 1 | 1 | 0.9 | 0.6 | 0 |
| $SA_{IN}$/t | 0.2 | 0.2 | 0.2 | 0.2 | 0.2 | 0.12 | 0.1 | 0 |
| $SA_{OUT}$/t | 0.2 | 0.2 | 0.2 | 0.2 | 0.2 | 0.38 | 0.4 | 0.5 |
| $SA_{IN}$/$SA_{OUT}$ | 1 | 1 | 1 | 1 | 1 | 0.9 | 0.6 | 0 |
| SA/T | 0.25 | 0.25 | 0.25 | 0.25 | 0.25 | 0.25 | 0.25 | 0.25 |
| High-speed durability km/h | 320 | 340 | 340 | 330 | 330 | 340 | 350 | 350 |
| Ride comfort | 3 | 3 | 3 | 3 | 2 | 3 | 3 | 3 |
| Quietness | 3 | 3 | 3 | 3 | 2 | 3 | 3 | 3 |

As can be seen from Table 1, each of Examples 1 to 11 had improved high-speed durability compared with Conventional Example 1, while maintaining quietness and ride comfort. On the other hand, in Comparative Example 1 the width of the band-shaped sound absorbing member was too small so the quietness was degraded. In Comparative Example 2, the width of the band-shaped sound absorbing member was too large, so the effect of heat build-up due to a center cover layer disposed on an outer circumferential side of the full cover layer and locally covering a center region of the plurality of belt layers in a tire lateral direction;

a width SW of the band-shaped sound absorbing member and a width BW of the plurality of belt layers satisfying a relationship SW/BW=0.3 to 0.8, and a width CW of the center cover layer and the width SW of the band-shaped sound absorbing member satisfying a relationship CW/SW=0.05 to 0.35.

2. The pneumatic tire according to claim 1, wherein a mounting direction with respect to a vehicle is designated;

when the pneumatic tire is mounted on the vehicle, an outer side of a tire equator with respect to the vehicle is a vehicle outer side, and when the pneumatic tire is mounted on the vehicle, an inner side of the tire equator with respect to the vehicle is a vehicle inner side; and a width $SW_{OUT}$ of a portion of the band-shaped sound absorbing member on the vehicle outer side, a width $SW_{IN}$ of a portion of the band-shaped sound absorbing member on the vehicle inner side, and the width CW of the center cover layer satisfy relationships $SW_{IN}/CW<5$, $SW_{OUT}/CW<8$, and $SW_{IN}/SW_{OUT}<0.9$.

3. The pneumatic tire according to claim 1, wherein a mounting direction with respect to a vehicle is designated;

when the pneumatic tire is mounted on the vehicle, an outer side of a tire equator with respect to the vehicle is a vehicle outer side, and when the pneumatic tire is mounted on the vehicle, an inner side of the tire equator with respect to the vehicle is a vehicle inner side; and a cross-sectional area $SA_{OUT}$ of a portion of the band-shaped sound absorbing member on the vehicle outer side, a cross-sectional area $SA_{IN}$ of a portion of the band-shaped sound absorbing member on the vehicle inner side, and a cross-sectional area T of a tire cavity satisfy relationships $0 \leq SA_{IN}/t \leq 0.2$ and $0.1 \leq SA_{OUT}/t \leq 0.4$ (t=T/2).

4. The pneumatic tire according to claim 1, wherein the center cover layer is made from organic fiber cords in which nylon fiber and aramid fiber are intertwined.

5. The pneumatic tire according to claim 1, wherein the band-shaped sound absorbing member comprises a missing portion at at least one section in the tire circumferential direction.

6. The pneumatic tire according to claim 2, wherein a mounting direction with respect to a vehicle is designated;

when the pneumatic tire is mounted on the vehicle, an outer side of a tire equator with respect to the vehicle is a vehicle outer side, and when the pneumatic tire is mounted on the vehicle, an inner side of the tire equator with respect to the vehicle is a vehicle inner side; and a cross-sectional area $SA_{OUT}$ of a portion of the band-shaped sound absorbing member on the vehicle outer side, a cross-sectional area $SA_{IN}$ of a portion of the band-shaped sound absorbing member on the vehicle inner side, and a cross-sectional area T of a tire cavity satisfy relationships $0 \leq SA_{IN}/t \leq 0.2$ and $0.1 \leq SA_{OUT}/t \leq 0.4$ (t=T/2).

7. The pneumatic tire according to claim 6, wherein the center cover layer is made from organic fiber cords in which nylon fiber and aramid fiber are intertwined.

8. The pneumatic tire according to claim 7, wherein the band-shaped sound absorbing member comprises a missing portion at at least one section in the tire circumferential direction.

* * * * *